United States Patent
Kriksunov et al.

(10) Patent No.: US 7,267,807 B2
(45) Date of Patent: Sep. 11, 2007

(54) METHOD AND DEVICE FOR TREATING AUTOMOTIVE EXHAUST

(76) Inventors: Leo B Kriksunov, 5 Perry La., Ithaca, NY (US) 14850-9267; Constantinos G Vayenas, 53 Agias Kyriakis St., Agios Vasilios, Rio, Patras (GR) GR 26500

( * ) Notice: Subject to any disclaimer, the term of this patent is extended or adjusted under 35 U.S.C. 154(b) by 435 days.

(21) Appl. No.: 10/906,175

(22) Filed: Feb. 6, 2005

(65) Prior Publication Data

US 2006/0177365 A1     Aug. 10, 2006

(51) Int. Cl.
*B01D 53/94* (2006.01)

(52) U.S. Cl. .................................. 423/213.2
(58) Field of Classification Search .............. 423/213.2
See application file for complete search history.

(56) References Cited

U.S. PATENT DOCUMENTS

| | | | |
|---|---|---|---|
| 4,329,208 A | 5/1982 | Vayenas |
| 5,410,871 A | 5/1995 | Masters |
| 5,417,062 A | 5/1995 | Swars |
| 5,419,123 A | 5/1995 | Masters |
| 5,433,926 A | 7/1995 | Swars |
| 5,441,706 A | 8/1995 | Whittenberger |
| 5,582,803 A | 12/1996 | Yoshizaki |
| 5,582,805 A | 12/1996 | Yoshizaki |
| 6,194,623 B1 | 2/2001 | Frenzel |
| 6,562,305 B1 | 5/2003 | Swars |
| 6,733,909 B2 | 5/2004 | Ding |
| 2001/0000889 A1 | 5/2001 | Yadav |
| 2002/0164507 A1 | 11/2002 | Ding |
| 2003/0010629 A1 | 1/2003 | St-Pierre |
| 2003/0165727 A1 | 9/2003 | Priestnall |
| 2004/0058203 A1 | 3/2004 | Priestnall |

OTHER PUBLICATIONS

The abstract of the reference titled "Electrochemical promotion of $CH_4$ oxidation on Pd" by Giannikos et al. published in Ionics, vol. 4, Nos. 1-2 (Jan. 1998), pp. 53-60.*

The effect of electrochemical oxygen pumping on the rate of CO oxidation on Au electrode-catalyst by O. A. Mar'ina et al. published in Catalysis Letters, vol. 13 (1992), pp. 61-70.*

* cited by examiner

*Primary Examiner*—Timothy C. Vanoy
(74) *Attorney, Agent, or Firm*—Leo B. Kriksunov

(57) ABSTRACT

The present invention applies the fundamental electrochemical NEMCA effect (Non-Faradaic Electrochemical Modification of Catalytic Activity), to the treatment of the automotive exhaust. A solid electrolyte layer is sandwiched between a conductive catalyst layer and the underlying metal honeycomb multichannel supporting structure forming the exhaust treatment device. Electric current is applied between the catalyst layer and the metallic structure resulting in an increase of catalytic activity of the catalyst. The exhaust stream is passing through the multichannel honeycomb structure and is catalytically treated with increased efficiency.

3 Claims, 6 Drawing Sheets

METHOD AND DEVICE FOR TREATING AUTOMOTIVE EXHAUST

DESCRIPTION

1. Field of the Invention

This invention relates to methods and devices for catalytically treating the exhaust of internal combustion engines and, more particularly, to exhaust treatment catalytic devices where catalytic activity is enhanced electrochemically utilizing the non-Faradaic electrochemical modification of catalytic activity (NEMCA) effect.

2. Background of the Invention

Catalytic exhaust gas treatment devices have been used for many years for treating exhaust from internal combustion engines, especially from motor vehicles, and the need for such devices is growing more urgent. With the advent of increasingly stringent exhaust emission control requirements, and increases in the demand for noble metal catalysts, increasing the efficiency of the catalytic treatment devices is paramount.

Various types of exhaust treatment devices are known to those skilled in the art. Some exhaust treatment devices incorporate catalysts which catalyze further oxidation of the constituents of the exhaust stream, while others provide a thermal reactor without the additional use of a catalyst bed. Some exhaust treatment systems are treating homogeneous exhaust as in the case of gasoline-fueled engines. Other treatment devices are capable of treating heterogeneous exhaust, such as diesel engine exhaust which includes soot. The devices aim at catalytically oxidizing various species present in the exhaust, including unburned hydrocarbons, carbon (soot), as well as oxides of oxygen and sulphur, typically referred to as NOx and SOx.

A typical device comprises a honeycomb or monolith, usually made of corrugated metal foil or of high temperature ceramics, with highly developed surface area achieved by many channels, corrugations, perforations, or by utilizing packed bed or packed mesh. A well developed surface of the device increases the surface area of the catalyst available for contact with the exhaust components and facilitates an improved oxidation.

Additional improvements include use of the electric current to further facilitate catalytic exhaust treatment. For example, U.S. Pat. Nos. 6,562,305; 6,562,305; 5,417,062; 5,441,706; 5,433,926; 5,582,805; and 5,582,803 disclose electrically heated catalytic converters. In the U.S. patent application Ser. No. 20010000889, an electric current was applied to directly heat and activate the catalyst layer. U.S. Pat. Nos. 5,419,123 and 5,410,871 disclose generation of electric sparks inside the catalytic converter to improve the exhaust treatment.

About 25 years ago it has been noticed that the activity of certain catalysts can be enhanced using electrochemical methods or electrochemical promotion, the effect now known as Non-Faradaic Electrochemical Modification of Catalytic Activity, or NEMCA effect. The first "non-Faradaic" catalytic effect of this type was reported in 1981 by C. G. Vayenas, et al., J. Catal., 70(1981)137. Over fifty catalytic chemical reactions have been tested since to show electrochemical promotion effects. A good overview of the NEMCA effect is provided in: "The Electrochemical Activation of Catalytic Reactions", C. G. Vayenas et al., Modern Aspects of Electrochemistry vol. 29, Edited by J. Bockris et al., Plenum Press, N.Y., 1996, pp. 57-202.

Additionally, NEMCA effect was utilized for improving catalytic activity in a number of processes related to selective electrochemical processing in U.S. Pat. Nos. 6,194,623; 4,329,208; 6,733,909; and U.S. patent applications Ser. Nos. 20040058203; 20030165727; 20030010629; and 20020164507.

The NEMCA effect, or electrochemical promotion, occurs upon applying an electrical voltage between a working electrode/catalyst, electrolyte, and a counter electrode. A catalytic reaction rate changes in a profound, controlled and reversible manner. The increase in catalytic rate can be up to a factor of 10-1000 times higher than an open-circuit catalytic rate and much higher than the corresponding Faradaic reaction rate. Furthermore, the activity of catalysts can be increased substantially by incorporating them in the vicinity of an electrode in an appropriate electrochemical cell and then operating the electrochemical cell. Further, the selectivity of such catalysts may be significantly altered and the relative rates at which competing reactions occur at the catalyst may be significantly changed too.

It is hypothesized that catalyst activity/selectivity is promoted by the presence or spillover of certain promoting ionic species, such as oxygen ions, generated during the operation of the electrochemical cell. In a simplified form, it is understood that the catalyst is activated or catalytic poisoning is reduced by a very small electrochemically applied electric current, so that the catalyst is activated and can more actively promote or catalyze chemical reactions, such as gas phase oxidation. This effect is fundamentally different from simply electrically heating the catalyst or catalyst supporting structure or passing electric current through the catalyst layer itself, when said catalyst layer is disposed on a non-conductive substrate.

SUMMARY OF THE INVENTION

Briefly stated, the present invention applies the fundamental electrochemical NEMCA effect to the treatment of the automotive exhaust. A solid electrolyte layer is sandwiched between a conductive catalyst layer and the underlying metal honeycomb forming the exhaust treatment device. Electric current is applied between the catalyst layer and the metallic structure resulting in an increase of catalytic activity.

More specifically, an electrochemical cell is formed on the surface of a metal-based channelized exhaust treatment device, such as corrugated metal foil reactor or honeycomb. This electrochemical cell is formed by coating the underlying metal structure with a thin coating which has some ionic conductivity at elevated temperatures characteristic of operation of the exhaust treatment devices (solid electrolyte coating). This solid electrolyte coating is in turn coated with an electrically conductive coating, at least one of components of which is a catalyst.

During the device operation, an electric current or voltage is applied between the underlying metal structure and the conductive coating, said current passing through the solid electrolyte layer and resulting in NEMCA-enhanced catalytic oxidation of the components of exhaust, including gaseous species and heterogeneous particulate such as soot.

It is an object of the present invention to provide an improved exhaust treatment system utilizing NEMCA effect or electrochemical promotion.

It is a further object of the present invention to provide a method and device for catalytic oxidation of incompletely burned species in the internal combustion engine exhaust, based upon non-Faradaic electrochemical modification of catalyst activity or electrochemical promotion. By applying a voltage, or small current, between the catalyst and the metal-based body of the exhaust treatment device through a solid electrolyte layer coating, the catalytic activity of the catalyst is enhanced.

It is a further object of the present invention to increase the catalytic oxidation rate, decrease the amount of partially oxidized and non-oxidized species in the exhaust, decrease the loading of noble metals in the catalysts, and shorten the start-up time of the catalytic exhaust treatment devices.

It is a further object of the present invention to provide an improved exhaust treatment device that enables to modify catalytic activity of the device as needed and thus improve performance at lower temperatures and also avoid overheating and damage to the device during overheating. Operating at lower temperatures can improve device longevity and reliability, as well as decrease the amount of unburned specifies in the exhaust during start-up.

It is a further object of the present invention to provide an improved method and device for catalytic oxidation of incompletely burned species in the internal combustion engine exhaust where the catalytic activity can be controlled by the amount of electric current or the amplitude of the electric voltage applied to the device.

Other objects and embodiments of the present invention will become more apparent to persons having ordinary skill in the art to which the present invention pertains from the following description taken in conjunction with the accompanying figures.

DETAILED DESCRIPTION OF THE PREFERRED EMBODIMENTS

Figure 1:
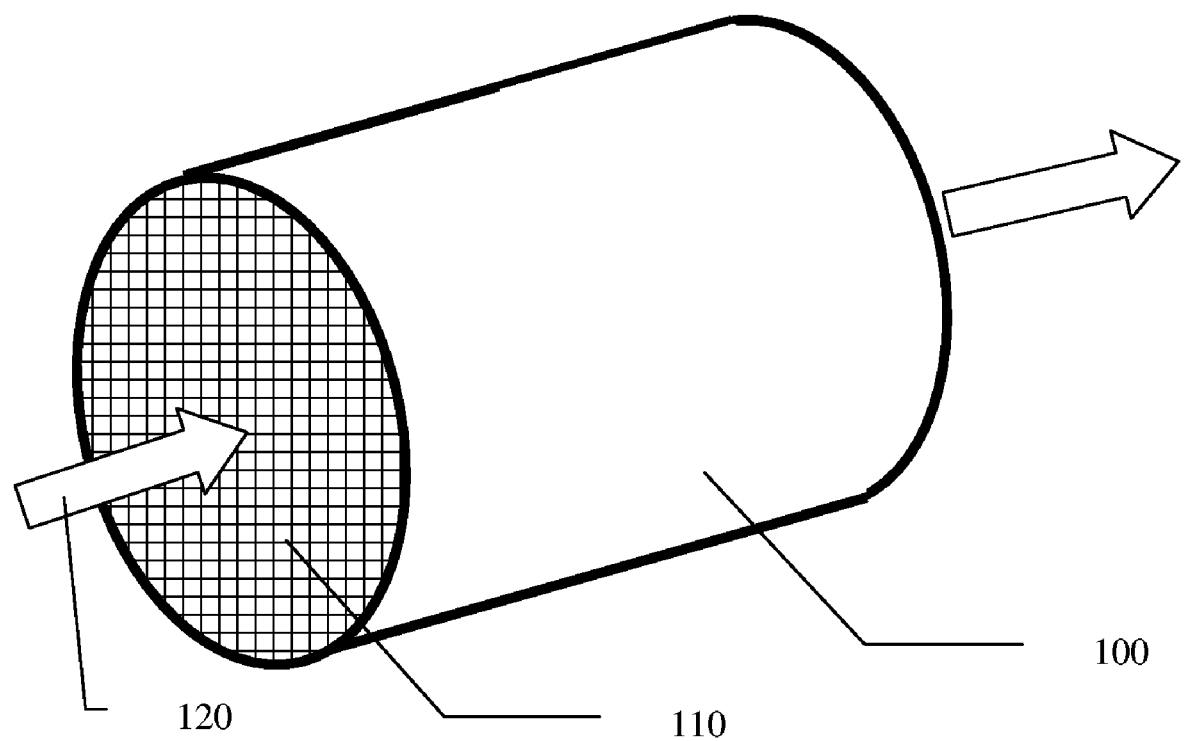
FIG. 1 illustrates the exhaust treatment device supporting structure.

Referring now to the drawings, in which like reference numerals refer to like parts throughout, FIG. 1 illustrates an exhaust treatment device supporting structure body, which in the preferred embodiment comprises a multicellular multichannel body 100 made of corrugated metal foil, with multiple channels 110 for treating exhaust stream 120 passing through the channels.

The supporting structure 100 can be formed of parallel plates, multiple tubular elements, corrugated metal foil, honeycomb, or multi-cellular monolith and is made of a corrosion resistant metallic alloy suitable for high temperature service in aggressive environments characteristic of automotive exhaust. Such alloys include, but not limited to, oxidation-resistant high temperature ferritic Cr—Al alloys. These iron-chrome-aluminum alloys typically contain up to seven percent of Al and some other additives. When exposed to high temperature oxidizing environments the alloy forms a thin corrosion-resistant layer of aluminum and chromium oxides, which prevents further oxidation.

The thickness of the metal foil forming the supporting structure is preferably from about 20 microns to about 500 microns. Methods of forming the supporting structure are known in the art.

Figure 2:
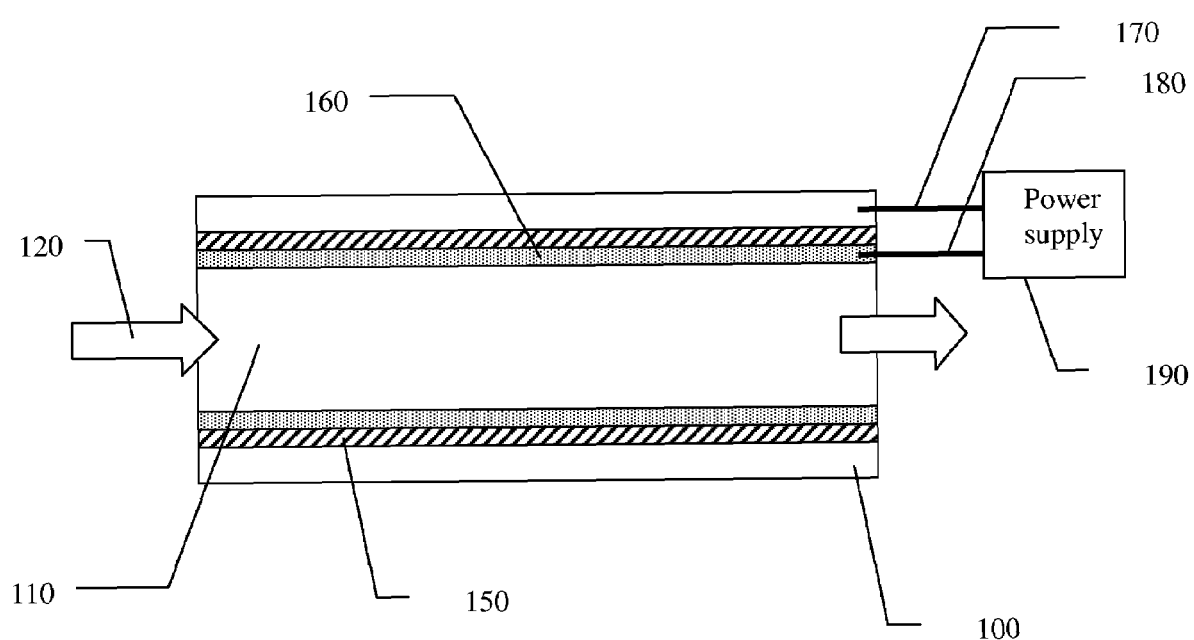
FIG. 2 illustrates a cross-section of a single exhaust treatment device channel through which the exhaust stream is passing.

Referring now to FIG. 2, illustrating a cross-section of a single exhaust treatment device channel 110 through which the exhaust stream 120 is passing.

The metallic supporting structure 100 forming the channel has on its surface a layer of solid electrolyte coating layer 150. This solid electrolyte layer is made of ceramic materials which are ionically conductive at elevated temperatures characteristic of operation of the exhaust treatment devices. The solid electrolyte which conducts oxygen ions in the electrochemical cell of the present invention may, for example, consist of cerium oxide ($CeO_2$), or cerium oxide stabilized with any of lanthanum oxide (La2O3), yttrium oxide (Y2O3), ytterbium oxide (Yb2O3) and/or gadolinium oxide (Gd2O3). It is furthermore possible to employ a solid electrolyte consisting of zirconium oxide (ZrO2), or zirconium oxide stabilized with any of calcium oxide (CaO), scandium oxide (Sc2O3), yttrium oxide (Y2O3) and/or ytterbium oxide (Yb2O3). In the simplest embodiment, the solid electrolyte which conducts oxygen ions contains a metal or metal oxide or complex mixed-metal oxides.

The thickness of the solid electrolyte layer is preferably from about 1 micron to about 500 microns.

The solid electrolyte layer can be applied by a variety of methods available to a skilled artisan. For example, CVD, PVD, wash coat, screen printing, sputtering, vapor deposition can be utilized for application of the solid electrolyte layer.

This solid electrolyte layer 150 is in turn coated with an electrically conductive catalytic coating layer 160, at least one of components of which is a catalyst. This conductive catalytic coating layer can be a layer of sintered catalytic particles or it can have a binder component to hold particles in place. The conductive catalytic layer can be applied by a variety of methods available to a skilled artisan. For example, CVD, PVD, wash coat, sputtering, screen printing, vapor deposition can be utilized for application of the conductive catalytic coating.

A power supply 190 is connected to the exhaust treatment device of this invention through electric conductors 170 and 180 to enable electrical actuation of the device. The power supply is capable of providing controlled current and or voltage to the exhaust treatment device, such power supply devices are known and widely available. The electric conductor 170 provides an electric connection to the metallic supporting structure 100. The electric conductor 180 provides an electric connection to the electrically conductive catalytic coating layer 160.

Figure 3:
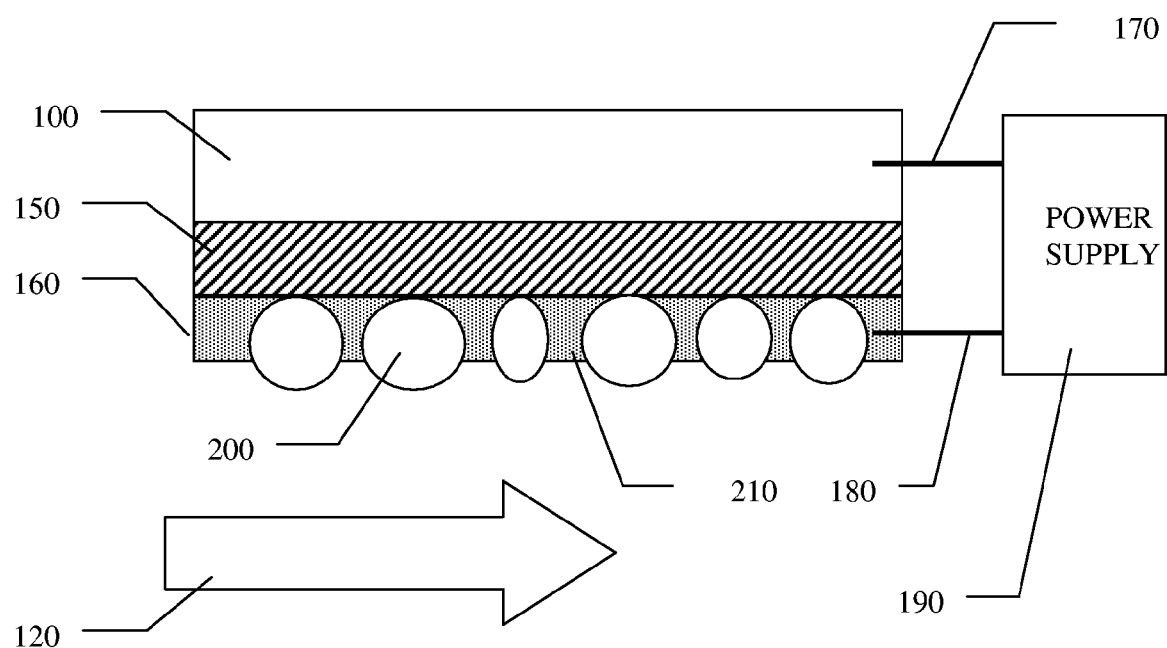
FIG. 3 illustrates the structure of coatings on the metallic supporting structure, formed electrochemical cell, and the principle of operation of the exhaust treatment device.
Figure 4:
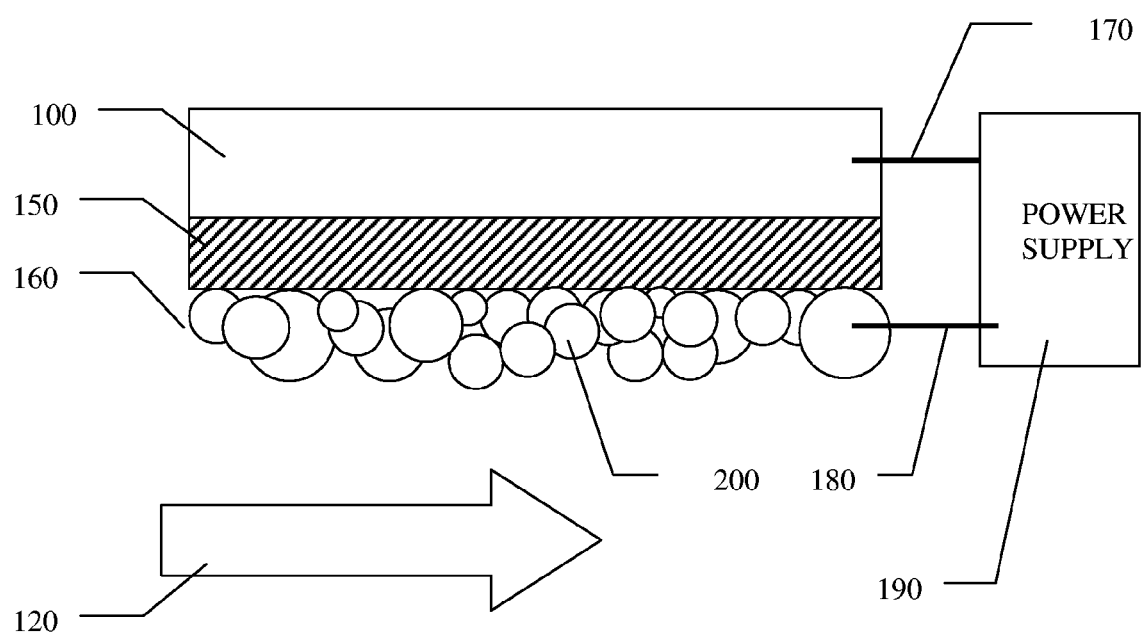
FIG. 4 further illustrates the structure of coatings on the metallic supporting structure, formed electrochemical cell, and the principle of operation of the exhaust treatment device.

Referring now to FIGS. 3 and 4, the structure of coatings on the metallic supporting structure 100 is shown in more detail. In FIG. 3, the conducive catalytic coating 160 comprises conductive binder component 210 and catalyst particles 200, which are pure metals, alloys, and compounds of Pt, Rh, Au, Pd, Ru, Ir, and other catalytically active metals and alloys. In FIG. 4, the conductive catalytic coating comprises the layer of sintered catalyst particles 200.

A conductive binder component 210 is a mixture of several conductive components, including metal particulates, metal salts, metal oxides, and the like. A preferred binder comprises Ag and Pt particulates on an $Y_2O_3$-stabilized-zirconia matrix, thus forming a conductive ceramic-metal (cermet) structure.

As it is seen in FIG. 3, an electrochemical cell is formed between conductive metallic support 100, solid electrolyte 150, and conductive catalyst layer 160. Electric voltage is applied to this electrochemical cell, causing electric current to flow through the electrochemical cell. In the preferred embodiment the catalyst layer is polarized anodically or cathodically. Application of the electric current to the described electrochemical cell results in electrochemical promotion of exhaust oxidation through NEMCA effect described above. The current can be applied constantly or periodically.

The typical current density applied to the device is ranging from about 0.01 to about 1000 mA/cm$^2$.

In another embodiment of the present invention, a solid electrolyte layer 150 is formed in situ on the surface of the metallic honeycomb by a controlled oxidation. For example, alloys containing zirconium, when exposed to oxidizing environment, are forming on their surfaces ionically conductive layers of zirconium oxides. Utilizing such alloys makes coating of the device with solid electrolyte unnecessary. After the controlled oxidation step, the device can be directly coated with the conductive catalytic layer. Any metallic oxide forming on the surface of metallic support structure of this invention, and having at least some ionic conductivity, is suitable to serve as the solid electrolyte layer for implementation of the present invention.

Figure 5:
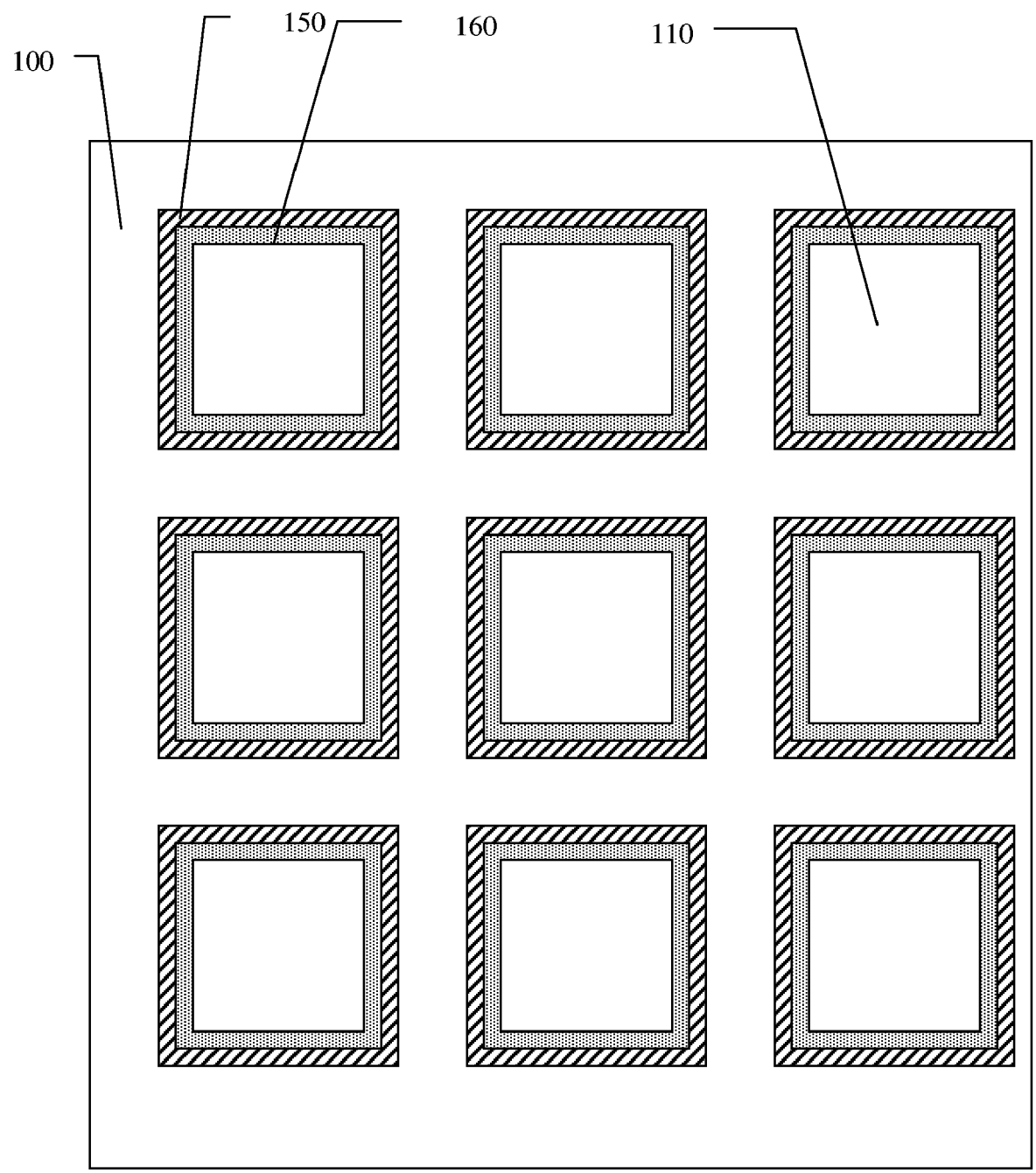
FIG. 5 further illustrates the exhaust treatment device and the structure of the coatings.

Referring now to FIG. 5, a cross-section of the exhaust treatment channelized device is presented to further illustrate the present invention. The solid electrolyte layer 150, applied by coating or formed in situ by controlled oxidation, and conductive catalyst layer 160 on the surface of each channel 110 are shown.

Figure 6:
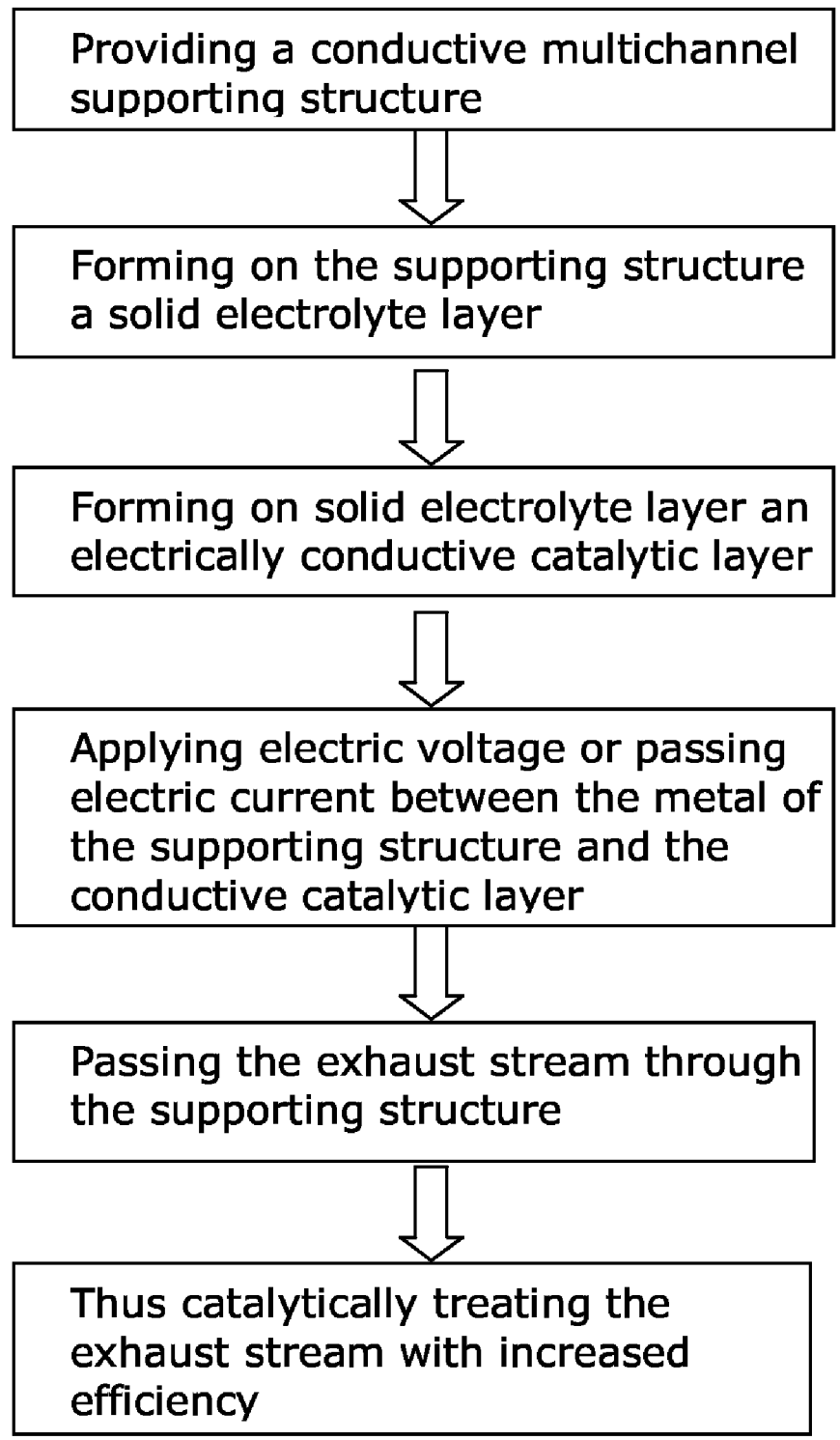
FIG. 6 illustrates the steps of the exhaust treatment according to the present invention.

Referring now to FIG. 6, the main steps of the method of the exhaust treatment are presented. As it is illustrated in the FIG. 6, the method comprises the steps of (a) providing a conductive multichannel supporting structure; (b) forming on the supporting structure a solid electrolyte layer; (c) forming on solid electrolyte layer an electrically conductive catalytic layer; (d) applying electric voltage or passing electric current between the metal of the supporting structure and the conductive catalytic layer; (e) passing the exhaust stream through the supporting structure thus catalytically treating the exhaust stream with increased efficiency.

The foregoing description addresses embodiments encompassing the principles of the present invention. The embodiments may be modified, changed, and/or implemented using various types of arrangements. Those skilled in the art will readily recognize various modifications and changes which may be made to the invention without strictly following the exemplary embodiments and applications illustrated and described herein, and without departing from the scope of the invention which is set forth in the following claims.

What is claimed is:

1. A method for treatment of an exhaust stream from an internal combustion engine comprising the steps of:
   providing a conductive multichannel supporting structure, adapted for passage of said exhaust stream through said supporting structure;
   forming on said supporting structure a solid electrolyte layer;
   forming on said solid electrolyte layer an electrically conductive catalytic layer wherein at least one component of said catalytic layer is a catalytic metal;
   applying electric voltage between said supporting structure and said conductive catalytic layer; and
   passing said exhaust stream through said supporting structure and catalytically treating said exhaust stream with increased efficiency.

2. A method according to claim 1, wherein said solid electrolyte layer is zirconia, yttria stabilized zirconia, calcia stabilized zirconia, ceria doped gadolinia or lanthana doped ceria.

3. A method according to claim 1, wherein said solid electrolyte layer is formed from one or more components selected from the group consisting of zirconia, yttria stabilized zirconia, calcia stabilized zirconia, ceria doped gadolinia, and lanthana doped ceria.

* * * * *